(12) United States Patent
Takashima et al.

(10) Patent No.: US 8,908,353 B2
(45) Date of Patent: Dec. 9, 2014

(54) LAMINATED CERAMIC CAPACITOR

(75) Inventors: Kenji Takashima, Takasaki (JP);
Shinsuke Takeoka, Takasaki (JP)

(73) Assignee: Taiyo Yuden Co., Ltd., Tokyo (JP)

( * ) Notice: Subject to any disclaimer, the term of this patent is extended or adjusted under 35 U.S.C. 154(b) by 0 days.

(21) Appl. No.: 13/880,678

(22) PCT Filed: Sep. 26, 2011

(86) PCT No.: PCT/JP2011/071789
§ 371 (c)(1),
(2), (4) Date: Jun. 12, 2013

(87) PCT Pub. No.: WO2012/120712
PCT Pub. Date: Sep. 13, 2012

(65) Prior Publication Data
US 2014/0009864 A1    Jan. 9, 2014

(30) Foreign Application Priority Data

Mar. 4, 2011    (JP) .................................. 2011-047897

(51) Int. Cl.
*H01G 4/10* (2006.01)
*C04B 35/468* (2006.01)
(Continued)

(52) U.S. Cl.
CPC .......... *H01G 4/1218* (2013.01); *C04B 35/4682* (2013.01); *H01B 3/12* (2013.01); *H01G 4/1227* (Continued)

(58) Field of Classification Search
CPC  H01B 3/12; C04B 35/4682; C04B 2235/782; C04B 2235/785; H01G 4/1227; H01G 4/30; H01G 4/1218

USPC ................................ 501/138, 139; 361/321.4
See application file for complete search history.

(56) References Cited

U.S. PATENT DOCUMENTS 6,301,092 B1    10/2001    Hata et al.
6,930,876 B1    8/2005    Noguchi et al.
(Continued)

FOREIGN PATENT DOCUMENTS

CN    1649049 A    8/2005
JP    2001-006966 A    1/2001
(Continued)

OTHER PUBLICATIONS

A Notice of Reasons for Refusal issued by Japanese Patent Office, mailed Jul. 2, 2014, for Japanese counterpart application No. 2013-503328.

(Continued)

*Primary Examiner* — Karl Group
(74) *Attorney, Agent, or Firm* — Law Office of Katsuhiro Arai

(57) ABSTRACT

A laminated ceramic capacitor has multiple layered dielectric ceramic layers of a dielectric ceramic constituted by primary phase grains whose primary component is $BaTiO_3$, secondary phase grains containing at least Re (Re represents at least one of Eu, Gd, Dy, Ho, Er, Yb, and Y), Ba, and Ti, and grain boundary phase containing at least one of B and Li or both; and internal electrodes which are made of Cu or Cu alloy. When a thickness of the dielectric ceramic layer is given by t, and when grain sizes at cumulative 20%, cumulative 50%, and cumulative 95% points of a cumulative count distribution of the primary phase grains are given by D20, D50, and D95, respectively, D20≤D50×70%, D50≤t/4, D95≤t/2, and CV value ((standard deviation between D20 and D95)/D50)<40% are satisfied.

13 Claims, 2 Drawing Sheets

(51) Int. Cl.
*H01G 4/12* (2006.01)
*H01B 3/12* (2006.01)
*H01G 4/30* (2006.01)

(52) U.S. Cl.
CPC .......... (2013.01); *H01G 4/30* (2013.01); *C04B 2235/3203* (2013.01); *C04B 2235/3208* (2013.01); *C04B 2235/3213* (2013.01); *C04B 2235/3215* (2013.01); *C04B 2235/3224* (2013.01); *C04B 2235/3225* (2013.01); *C04B 2235/3232* (2013.01); *C04B 2235/3236* (2013.01); *C04B 2235/3239* (2013.01); *C04B 2235/3256* (2013.01); *C04B 2235/3262* (2013.01); *C04B 2235/3281* (2013.01); *C04B 2235/3409* (2013.01); *C04B 2235/5409* (2013.01); *C04B 2235/5445* (2013.01); *C04B 2235/6567* (2013.01); *C04B 2235/782* (2013.01); *C04B 2235/785* (2013.01); *C04B 2235/79* (2013.01); *C04B 2235/80* (2013.01)
USPC .......................... 361/321.4; 501/139; 501/138

(56) References Cited

U.S. PATENT DOCUMENTS

| | | | |
|---|---|---|---|
| 7,710,712 B2* | 5/2010 | Takeoka | 361/321.2 |
| 2004/0176239 A1 | 9/2004 | Nakamura et al. | |
| 2008/0004172 A1 | 1/2008 | Kojima et al. | |
| 2008/0030921 A1 | 2/2008 | Kaneda et al. | |
| 2008/0068777 A1* | 3/2008 | Takeoka | 361/321.4 |
| 2009/0264276 A1 | 10/2009 | Yamashita et al. | |
| 2010/0033895 A1 | 2/2010 | Yao | |
| 2010/0053843 A1 | 3/2010 | Muraki et al. | |
| 2010/0214717 A1 | 8/2010 | Nakamura et al. | |
| 2012/0001125 A1 | 1/2012 | Oguro et al. | |
| 2014/0002955 A1* | 1/2014 | Takeoka | 361/321.4 |

FOREIGN PATENT DOCUMENTS

| | | | |
|---|---|---|---|
| JP | 2004-107200 A | 4/2004 | |
| JP | 2004-262717 A | 9/2004 | |
| JP | 2005-162557 A | 6/2005 | |
| JP | 2005-217305 A | 8/2005 | |
| JP | 2006-327890 A | 12/2006 | |
| JP | 2007-331957 A | 12/2007 | |
| JP | 2008-042150 A | 2/2008 | |
| JP | 2008-072072 A | 3/2008 | |
| JP | 2009-256140 A | 11/2009 | |
| JP | 2010-040798 A | 2/2010 | |
| JP | 2010-052964 A | 3/2010 | |
| JP | 2010-199260 A | 9/2010 | |
| JP | 2010-235413 A | 10/2010 | |
| WO | 2012043427 A1 | 4/2012 | |
| WO | 2012053316 A1 | 4/2012 | |

OTHER PUBLICATIONS

An Office Action issued by the Korean Patent Office, mailed Apr. 21, 2014, for Korean counterpart application No. 10-2013-7004946.
A Notification of First Office Action with Search Report issued by the State Intellectual Property Office of China, mailed Nov. 29, 2013, for Chinese counterpart application No. 201180051091.6.
Notification of Transmittal of Translation of the International Preliminary Report on Patentability (PCT/IB/338) mailed Nov. 14, 2013, with International Preliminary Report on Patentability (PCT/IB/373) and Written Opinion of the International Searching Authority (PCT/ISA/237), for corresponding international application PCT/JP2011/071789.

* cited by examiner

US 8,908,353 B2

LAMINATED CERAMIC CAPACITOR

This application is the U.S. National Phase under 35 U.S.C. §371 of International Application PCT/JP2011/071789, filed Sep. 26, 2011, which claims priority to Japanese Patent Application No. 2011-047897, filed Mar. 4, 2011. The International Application was published under PCT Article 21(2) in a language other than English.

TECHNICAL FIELD

The present invention relates to a laminated ceramic capacitor comprising dielectric layers whose primary component is barium titanate, and more specifically to a laminated ceramic capacitor whose structure is improved in a manner satisfying X7R temperature characteristics even when sintered at low temperature and also demonstrating an excellent longevity even when made thinner.

BACKGROUND ART

Laminated ceramic capacitors produced by simultaneous sintering of dielectric ceramic composition and internal electrodes have been developed in recent years as compact, large-capacity capacitor elements. Traditional dielectric ceramic compositions have high sintering temperatures of 1150° C. to 1400° C. and therefore nickel (Ni) or nickel alloy that withstands high temperatures has been used as the leading electrode material for simultaneous sintering with internal electrodes. However, nickel is a rare metal and as the demand for rare metals is expected to grow and prices of rare metals escalate in recent years, alternative technologies are drawing attention, and there is a growing demand for replacing internal electrodes using nickel (hereinafter also referred to as "Ni") with internal electrodes using copper (hereinafter also referred to as "Cu") or other metal whose bullion is cheaper.

However, since copper has a melting point of 1085° C., which is lower than the melting point of nickel, use of copper in internal electrodes requires sintering to be implemented at 1030° C. or preferably 1000° C. or below, which gives rise to a problem, or specifically a need for dielectric material for laminated ceramic capacitors that can demonstrate sufficient characteristics even when sintered at temperatures lower than the temperatures traditionally used.

In light of the aforementioned situations, the inventors of the present invention studied with the purpose of obtaining a laminated ceramic capacitor which can be sintered at 1030° C. or preferably 1000° C. or below in a reducing ambience, which does not contain lead (Pb) or bismuth (Bi) in its dielectric ceramic layers, and which has a dielectric constant of 2000 or more, X7R temperature characteristics of dielectric constant and high-temperature stress longevity traits equivalent to conventional laminated ceramic capacitors with Ni internal electrodes, and discovered conditions for Ba/Ti ratio, composition ratio of rare earths as auxiliary components, and MnO composition ratio, for a dielectric ceramic composition whose primary component is a $BaTiO_3$ compound. Based on the above, the inventors of the present invention propose a laminated ceramic capacitor having: multiple dielectric ceramic layers; internal electrodes which are formed between the dielectric ceramic layers in a manner opposing each other and led out alternately to different end faces; and external electrodes which are formed on both end faces of the dielectric ceramic layers and connected electrically to the internal electrodes; wherein such laminated ceramic capacitor is characterized in that: the dielectric ceramic layer is a sintered compact constituted by a primary component expressed by $ABO_3+aRe_2O_3+bMnO$ (where $ABO_3$ is a perovskite dielectric mainly constituted by $BaTiO_3$, $Re_2O_3$ represents at least one type of metal oxide selected from La, Ce, Pr, Nd, Sm, Eu, Gd, Tb, Dy, Ho, Er, Tm, Yb, Lu, and Y, and a and b represent mol numbers relative to 100 mol of $ABO_3$) in the ranges of $1.000 \le A/B \le 1.035$, $0.05 \le a \le 0.75$, and $0.25 \le b \le 2.0$, as well as auxiliary components that include at least one type of element selected from B, Li, and Si for a total of 0.16 to 1.6 parts by mass in equivalent $B_2O_3$, $Li_2O$, and $SiO_2$, respectively; and that the internal electrodes are constituted by Cu or Cu alloy (Patent Literature 1).

The inventors of the present invention also proposed that, with a laminated ceramic capacitor whose internal electrodes are constituted by Cu or Cu alloy, X7R or X8R temperature characteristics can be achieved by obtaining its dielectric ceramic as a sintered compact of perovskite dielectric material primarily constituted by $BaTiO_3$, comprised of grains whose average diameter is 400 nm or less in a section view as well as grain boundaries (Patent Literature 2), where examples illustrate mixtures of MnO as a starting material for sintered compact, with $B_2O_3$, $Li_2O$, and $SiO_2$, as additive rare earth oxides and sintering auxiliaries.

Furthermore, the inventors of the present invention discovered that, with a dielectric ceramic composition constituted by a primary component constituted by $BaTiO_3$ as well as auxiliary components constituted by Re, Mn, V, Mo, Cu, B, Li, Ca, and Sr, the total content of V and Mo, in addition to the contents of Re, Mn, B, and Li, would affect the life characteristics of the laminated ceramic capacitor using internal electrodes whose primary component is Cu, and proposed a dielectric ceramic composition characterized in that it is expressed by $BaTiO_3+aRe_2O_3+bMnO+cV_2O_5+dMoO_3+eCuO+fB_2O_3+gLi_2O+xSrO+yCaO$ (where Re represents at least one type of element selected from Eu, Gd, Dy, Ho, Er, Yb, and Y, and a to h represent mol numbers relative to 100 mol of the primary component constituted by $BaTiO_3$) and, when the mol ratio of (Ba+Sr+Ca)/Ti contained in the dielectric ceramic composition is given by m, $0.10 \le a \le 0.50$, $0.20 \le b \le 0.80$, $0 \le c \le 0.12$, $0 \le d \le 0.07$, $0.04 \le c+d \le 0.12$, $0 \le e \le 1.00$, $0.50 \le f \le 2.00$, $0.6 \le (100(m-1)+2g)/2f \le 1.3$, $0.5 \le 100(m-1)/2g \le 5.1$, $0 \le x \le 1.5$, and $0 \le y \le 1.5$ are satisfied (Patent Literature 3).

In the meantime, thinning of dielectric ceramic layers constituting laminated ceramic capacitors is being examined as one effective means for meeting the required size reduction and capacity increase, and various proposals have been presented regarding design for reliability after thinning. For example, Patent Literature 4 describes mixing crushed material powder and uncrushed material powder at an appropriate ratio to obtain a structure where one peak appears in an area of less than one-quarter of the layer thickness and another in an area of more than that, in order to achieve both high dielectric constant and high electrical insulation property even when the layer is made as thin as less than 1 μm. In addition, Patent Literature 5 adopts a structural method whereby the number of grains per layer is reduced and limited to facilitate diffusion of Mn and V across the grain boundaries, to permit layer thickness reduction and achieve good longevity traits. Furthermore, Patent Literature 6 achieves both layer thickness reduction to less than 1 μm and good longevity traits at the same time by containing a Li compound as a sintering auxiliary and adjusting the average grain size Rg [μm] of the dielectric ceramic to $0.06 < Rg < 0.17$ and its standard deviation σg [μm] to $σg < 0.75$, while Patent Literature 7 adopts a method whereby a compound having the same composition as the secondary phase is mixed into the dielectric material before sintering, to suppress excessive generation of the secondary phase, so that generation of the secondary phase, which can cause the reliability to drop, can be limited. With this method, the size of the secondary phase is limited to one-third or less of the thickness of the dielectric. In addition, Patent Literature 8 describes that temperature characteristics of capacitance, dielectric breakdown voltage, and high-temperature load longevity could be improved with a thin-layer structure by separating the $M_4R_6O(SiO_4)_6$ crystal phase (M represents at least one type of alkali earth metal) at the grain boundary layers sandwiched between two primary phase grains constituted by $BaTiO_3$, as well as at the triple points. Furthermore in Patent Literature 9, it was found that separation of excessive Ba, Si, and other alkali earth metals at the triple points as noncrystalline substances was lowering the reliability. Accordingly, at least 80% of the cross-section area at triple points was kept to 8 nm or below, and crystalline oxide grains containing Ba, Ti, and Si were separated into the dielectric ceramic layers instead, to achieve high reliability with this thin-layer structure.

BACKGROUND ART LITERATURES

Patent Literatures

Patent Literature 1: Japanese Patent Laid-open No. 2008-42150
Patent Literature 2: Japanese Patent Laid-open No. 2008-72072
Patent Literature 3: Japanese Patent Laid-open No. 2010-235413
Patent Literature 4: Japanese Patent Laid-open No. 2010-199260
Patent Literature 5: Japanese Patent Laid-open No. 2010-40798
Patent Literature 6: Japanese Patent Laid-open No. 2010-52964
Patent Literature 7: Japanese Patent Laid-open No. 2001-6966
Patent Literature 8: Japanese Patent Laid-open No. 2004-107200
Patent Literature 9: Japanese Patent Laid-open No. 2004-262717

SUMMARY OF THE INVENTION

Problems to be Solved by the Invention

The inventors of the present invention further made repeated studies on a laminated ceramic capacitor using copper in its internal electrodes and discovered that Patent Literatures 1 to 3 above that had already been proposed were still examining thickness levels of several µ or more, leaving room for examining how reliability could be ensured when the dielectric ceramic layer thickness is reduced to 2 µm or less, or preferably 1 µm or less. On the other hand, it was also discovered that the reliability designs after layer thickness reduction as described in Patent Literatures 4 to 9 above, among others, were not sufficient as they were not considering the aforementioned low-temperature sintering.

Specifically under Patent Literatures 4 and 5 above, Ni is used for the internal electrodes and thus the sintering temperature is 1150° C., which is too high to use Cu for the internal electrodes. Also in Patent Literature 6, sintering at a low temperature of 1025° C. is possible, but only Si and Li are contained as components that would allow for low-temperature sintering. In this system, Li volatilizes easily in the sintering step and thus obtaining stable characteristics is difficult. In addition, the method described in Patent Literature 7 does not permit use of Cu for the internal electrodes because the sintering temperature is high at 1200° C. or above. Moreover, the composition described in Patent Literature 8 requires a high sintering temperature of 1200° C. or above and thus Cu cannot be used for the internal electrodes. In addition, Patent Literature 9 does not consider low-temperature sintering and, in fact, sintering at 1030° C. or below is not possible based on the described composition alone.

The present invention was completed in light of the aforementioned situation and its object is to provide a laminated ceramic capacitor which can be sintered at a low temperature of 1030° C. or below and which also offers high dielectric constant, good longevity traits and temperature characteristics satisfying X7R, even when made thinner.

Means for Solving the Problems

After studying repeatedly and further to achieve the aforementioned object, the inventors of the present invention found that, with respect to a laminated ceramic capacitor having: a ceramic laminate of roughly rectangular solid shape constituted by multiple layered dielectric ceramic layers of 2 µm or less in thickness each, which in turn are constituted by a dielectric ceramic constituted by primary phase grains whose primary component is $BaTiO_3$, secondary phase grains containing at least Re (Re represents at least one of Eu, Gd, Dy, Ho, Er, Yb, and Y), Ba, and Ti, and grain boundary phase containing at least one of B (boron) and Li (lithium) or both; internal electrodes which are made of Cu or Cu alloy and formed in a manner opposing each other via the dielectric ceramic and lead out alternately to different end faces; and external electrodes which are formed on both end faces of the ceramic laminate and electrically connected to the internal electrodes led out to the end faces, both high dielectric constant and longevity could be achieved at the same time, even when sintered at low temperature using B and Li, by specifying the grain size distribution of primary phase grains. The inventors also found that both desired sintering property and reliability could be achieved by allowing relatively large secondary phases including rare earths to exist, thereby promoting the sintering of primary phase grains and allowing the rare earths to gradually diffuse from the secondary phase to the grain boundary phase. Furthermore, the inventors found that, while partial diffusion of Ba from the primary phase grain component $BaTiO_3$ to the grain boundary phase could form a dense condition at low temperature, excessive diffusion of Ba might cause the crystalline property to drop and defects to form, resulting in lower reliability.

The present invention was completed as a result of repeated studies based on the aforementioned findings, and provides the following: [1] A laminated ceramic capacitor having: a ceramic laminate of roughly rectangular solid shape constituted by multiple layered dielectric ceramic layers which in turn are constituted by a dielectric ceramic constituted by primary phase grains whose primary component is $BaTiO_3$, secondary phase grains containing at least Re (Re represents at least one of Eu, Gd, Dy, Ho, Er, Yb and Y), Ba, and Ti, and grain boundary phase containing at least one of B (boron) and Li (lithium) or both; internal electrodes which are made of Cu or Cu alloy and formed in a manner opposing each other via the dielectric ceramic layers and lead out alternately to different end faces; and external electrodes which are formed on both end faces of the dielectric ceramic layers and connected electrically to the internal electrodes led out to the end faces; wherein such dielectric ceramic capacitor is characterized in that, when the thickness of the dielectric ceramic layer sandwiched between the internal electrodes is given by t, and when the grain sizes at the cumulative 20%, cumulative 50%, and cumulative 95% points of the cumulative count distribution (hereinafter referred to as "grain size distribution") obtained by measuring the sizes of the primary phase grains in the dielectric ceramic layer are given by D20, D50, and D95, respectively, D20≤D50×70%, D50≤t/4, D95≤t/2, and CV value ((standard deviation between D20 and D95)/D50)<40% are satisfied. [2] A laminated ceramic capacitor according to [1], characterized in that, on average, five or more of the secondary phase grains of 0.1 μm or more in grain size are present in a random 5 μm×5 μm area of the dielectric ceramic layer. [3] A laminated ceramic capacitor according to [2], characterized in that, on average, in the random 5 μm×5 μm area, there are fewer than two secondary phase grains whose grain size is greater than that at the cumulative 80% (D80) point of the cumulative count distribution of primary phase grains. [4] A laminated ceramic capacitor according to any one of [1] to [3], characterized in that the Ba/Ti ratio in the grain boundary phase divided by the Ba/Ti ratio in the primary phase grain is 1.2 or less. [5] A laminated ceramic capacitor according to any one of [1] to [4], characterized in that the dielectric ceramic is constituted by a dielectric ceramic composition which in turn is constituted by a primary component constituted by $BaTiO_3$ and auxiliary components constituted by Re, Mn, V, Mo, Cu, B, Li, Ca, and Sr, wherein the dielectric ceramic composition is expressed by $BaTiO_3 + aRe_2O_3 + bMnO + cV_2O_5 + dMoO_3 + eCuO + fB_2O_3 + gLi_2O + xSrO + yCaO$ (where Re represents at least one type of element selected from Eu, Gd, Dy, Ho, Er, Yb, and Y, and a to g, x, and y represent mol numbers relative to 100 mol of the primary component constituted by $BaTiO_3$) and, when the mol ratio of (Ba+Sr+Ca)/Ti contained in the dielectric ceramic composition is given by m, $0.10 \leq a \leq 0.50$, $0.20 \leq b \leq 0.80$, $0 \leq c \leq 0.12$, $0 \leq d \leq 0.07$, $0.04 \leq c+d \leq 0.12$, $0 \leq e \leq 1.00$, $0.50 \leq f \leq 2.00$, $0.6 \leq (100(m-1)+2g)/2f \leq 1.3$, $0.5 \leq 100(m-1)/2g \leq 5.1$, $0 \leq x \leq 1.5$, and $0 \leq y \leq 1.5$ are satisfied. [6] A laminated ceramic capacitor according to [5], characterized in that Si contained as impurity accounts for 1.0 mol or less in equivalent $SiO_2$ relative to 100 mol of the primary component constituted by $BaTiO_3$. [7] A laminated ceramic capacitor according to [5] or [6], characterized in that the dielectric ceramic composition can be made denser at a sintering temperature of 1030° C. or below. [8] A laminated ceramic capacitor according to any one of [1] to [7], characterized in that the thickness of the dielectric ceramic layer is 2 μm or less.

Effects of the Invention

According to the present invention, high dielectric constant of 1800 or more, temperature characteristics satisfying X7R characteristics, and good longevity traits satisfying a longevity of over 100 hours even under a high-temperature load equivalent to 150° C. in temperature and 20 kV/mm in electric field intensity, can be achieved even when sintering is implemented at a temperature of 1030° C. or below and even when the thickness of the dielectric ceramic layer is reduced to 2 μm or less.

MODE FOR CARRYING OUT THE INVENTION

Figure 1:
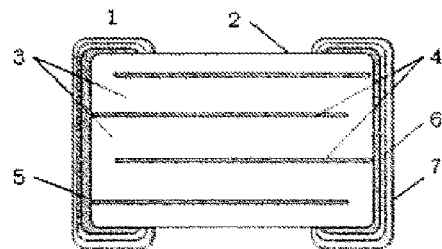
[FIG. 1] Schematic drawing showing an embodiment of a laminated ceramic capacitor conforming to the present invention

An embodiment of a laminated ceramic capacitor conforming to the present invention is explained. A laminated ceramic capacitor 1 in this embodiment has a ceramic laminate 2 constituted by multiple dielectric ceramic layers 3 and internal electrodes 4 formed between the dielectric ceramic layers, as shown in FIG. 1. Formed on both end faces of the ceramic laminate 2 are external electrodes 5 that connect electrically to the internal electrodes, and a first plating layer 6 and second plating layer 7 are formed on top as necessary. The thickness of the dielectric ceramic layer 3 sandwiched between the adjacent internal electrodes 4 is less than 2 μm.

The dielectric ceramic constituting the dielectric ceramic layer 3 is constituted by a dielectric ceramic composition which in turn is constituted by a primary component constituted by $BaTiO_3$ as well as auxiliary components constituted by Re, Mn, V, Mo, Cu, B, Li, Ca, and Sr, where the dielectric ceramic composition is expressed by $BaTiO_3 + aRe_2O_3 + bMnO + cV_2O_5 + dMoO_3 + eCuO + fB_2O_3 + gLi_2O + xSrO + yCaO$ (where Re represents at least one type of element selected from Eu, Gd, Dy, Ho, Er, Yb, and Y, a to g, x, and y represent mol numbers relative to 100 mol of the primary component constituted by $BaTiO_3$, and m represents the mol ratio of (Ba+Sr+Ca)/Ti contained in the dielectric ceramic composition) and where $0.10 \leq a \leq 0.50$, $0.20 \leq b \leq 0.80$, $0 \leq c \leq 0.12$, $0 \leq d \leq 0.07$, $0.04 \leq c+d \leq 0.12$, $0 \leq e \leq 1.00$, $0.50 \leq f \leq 2.00$, $0.6 \leq (100(m-1)+2g)/2f \leq 1.3$, $0.5 \leq 100(m-1)/2g \leq 5.1$, $0 \leq x \leq 1.5$, and $0 \leq y \leq 1.5$.

Here, a small amount of $Re_2O_3$, or a, especially less than 0.10, causes the longevity to drop significantly, while an excessive amount causes the sintering property to drop and even makes sintering at 1030° C. or below difficult when the amount is greater than 0.50. Accordingly, the range is preferably $0.10 \leq a \leq 0.50$. A more preferable range is $0.20 \leq a \leq 0.35$ where good longevity traits and densification at 1000° C. or below can be achieved.

On the other hand, a small amount of MnO, or b, causes the longevity to drop, while an excessive amount causes the sintering property to drop and even makes sintering at 1030° C. or below difficult when the amount is greater than 0.80. Accordingly, the range is preferably $0.20 \leq b \leq 0.80$. A more preferable range is $0.20 \leq b \leq 0.60$ where good longevity traits and densification at 1000° C. or below can be achieved.

Since the longevity traits drop when either V or Mo is not included as an auxiliary component, $c+d \geq 0.04$ is desirable, but the longevity traits also drop when the total content of V and Mo is excessive. Accordingly, the range is preferably $0.04 \leq c+d \leq 0.12$. Furthermore, the longevity traits drop when more than 0.12 of V and more than 0.07 of Mo are added, which suggests that $0 \leq c \leq 0.12$ and $0 \leq d \leq 0.07$ are preferable. In particular, better longevity traits can be achieved in the range of $0 \leq c \leq 0.10$.

It is known that use of Cu in the internal electrodes causes Cu to diffuse from the internal electrodes to the dielectric layers. Accordingly, it is assumed that Cu is already contained in the dielectric layers, without adding Cu separately, and that this content of Cu improves the longevity traits. Here, the diffusion of Cu from the internal electrodes to the dielectric layers is assumed to reach equilibrium and stabilize when CuO is not added. However, the longevity drops when Cu is added externally to the point of excessive abundance of Cu.

Accordingly, 0≤e≤1.00 is preferable. It should be noted that Cu can be contained in the dielectric layers by causing Cu to diffuse from the Cu internal electrodes to the dielectric layers in the sintering step, instead of adding Cu as a material in the material step.

A content of $B_2O_3$, or f, of less than 0.50 causes the sintering property to drop and makes sintering at 1030° C. or below difficult, while a content larger than 2.00 causes the longevity to drop, and accordingly the range is preferably 0.50≤f≤2.00. To achieve even lower sintering temperatures, a more preferable range is 0.65≤f≤1.5 where good longevity traits and densification at 1000° C. or below can be achieved.

Also, as for the amount of $Li_2O$, or g, the longevity drops when (100 (m−1)+2g)/2f is less than 0.6, while the sintering property drops and densification at 1030° C. or below becomes difficult when it is greater than 1.3. Accordingly, the range is preferably 0.6≤(100 (m−1)+2g)/2f≤1.3. Also, preferably m>1 because the longevity traits drop when m≤1. Note, however, that the value of m is not uniquely determined when the $BaTiO_3$ compound is synthesized, and similar effects can be achieved by adding oxides and carbides of Ba, Sr, and Ca in the material step to adjust the value of m. The longevity traits drop when 100 (m−1)/2g is less than 0.50, while the sintering property drops and sintering at 1030° C. or below becomes difficult when it is greater than 5.1. Accordingly, the range is preferably 0.50≤100 (m−1)/2h≤5.1. Also, Sr and Ca can be used as adjustment elements in the same manner as Ba. Under the present invention, adjustment of m has been confirmed effective in the ranges of 0≤x≤1.5 and 0≤y≤1.5. Furthermore, similar effects can be achieved by adding $(Ba_{1−x−y}Sr_yCa_w)TiO_3$ whose primary components are Sr and Ca, because added Sr and Ca dissolve in the primary component of $BaTiO_3$ compound in the sintering step.

Desirably Si is not contained for lowering the sintering temperature, but it is highly likely that Si is contained during the manufacturing process, such as in the dispersion step. Accordingly, $SiO_2$ was added intentionally to check the stability of the system relative to the Si content, and it was found that the characteristics were not significantly affected as long as the Si content was 1.0 percent by mol or less in equivalent $SiO_2$. On the other hand, however, the sintering property drops significantly when Si is contained by more than 1.0 percent by mol, and therefore the content of $SiO_2$ impurity must be kept to 1.0 percent by mol or less in equivalent $SiO_2$ relative to 100 mol of the primary component constituted by $BaTiO_3$.

As described above, a dielectric ceramic composition and laminated ceramic capacitor are proposed which, by the design of the dielectric ceramic composition used in their dielectric layers 2, can be sintered at a low temperature of 1030° C. or below, or preferably 1000° C. or below, without containing lead, bismuth, or other substance harmful to the environment or to the human body in their composition, which can be co-sintered with metals primarily constituted by Cu and offering excellent electrical conductivity, which have high dielectric constant and also exhibit sufficient dielectric characteristics to satisfy X7R characteristics or X5R characteristics, and which offer high insulation resistance and excellent longevity traits under high-temperature load, etc., even when sintered in a neutral or reducing ambience.

To produce a dielectric ceramic conforming to the present invention, a ceramic material is prepared which contains a primary component material constituted by a $BaTiO_3$ compound as well as auxiliary component materials including at least Re (here, Re represents at least one type of element selected from Eu, Gd, Dy, Ho, Er, Yb, and Y), Mn, B, Si, and Li, and at least one of V and Mo, or further Cu, Ba, Sr, and Ca, in the form of oxide, glass or other compound. The average grain size of the $BaTiO_3$ powder which is the primary component of the dielectric ceramic layer 3 under the present invention is 0.10 µm or more but not more than 0.30 µm.

The internal electrode 4 is constituted by Cu or Cu alloy. Examples of Cu alloy include Cu—Ni alloy and Cu—Ag alloy, among others. This internal electrode 4 is formed by printing a conductive paste on a ceramic green sheet by screen printing or other method. The conductive paste contains, in addition to a metal material of Cu or Cu alloy, a ceramic material which is roughly the same as the ceramic material constituting the dielectric ceramic layer 3, in order to reduce the contraction difference from the sintering contraction of the dielectric ceramic layer 3.

By laminating ceramic green sheets on which the conductive paste has been printed, a raw ceramic laminate is obtained. When this molded product is sintered at 1030° C. or below to prevent melting of the internal electrodes 4, in a nitrogen ambience or reducing ambience produced by mixing nitrogen with hydrogen gas of less than 3.0% in concentration to prevent oxidization of the internal electrodes 4, a sintered ceramic laminate 2 is obtained. If sintering is implemented in a reducing ambience, heat treatment must be applied at a temperature of approx. 700° C. in an ambience of nitrogen, etc., in the temperature-lowering step.

Figure 2:
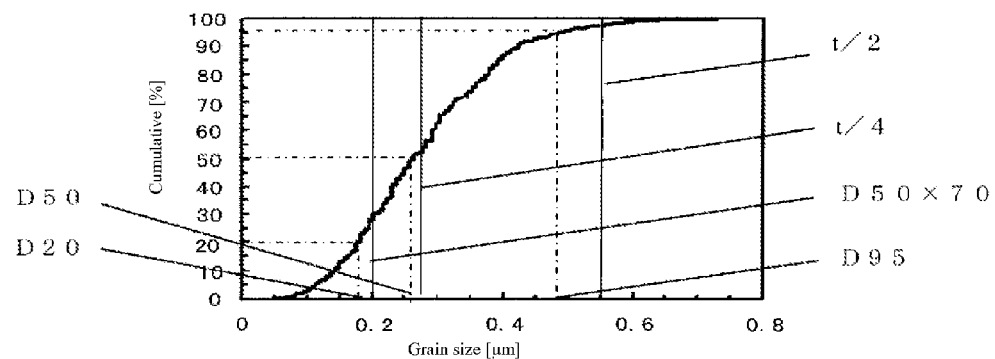
[FIG. 2] Drawing showing the cumulative count distribution of primary phase grain sizes in the dielectric ceramic layer

Under the present invention, the sintered dielectric ceramic layer 3 contains $BaTiO_3$ as its primary phase grains. The primary phase grains have the grain size distribution shown in FIG. 2 when the thickness of the dielectric ceramic layer sandwiched between the internal electrodes 4 is given by t. FIG. 2 shows the grain size distribution of the primary phase grains in the dielectric ceramic layer, where the vertical axis represents the cumulative count, while the horizontal axis represents the grain size.

The present invention is characterized in that, when the grain sizes at the cumulative 20%, cumulative 50%, and cumulative 95% points of the grain size distribution are given by D20, D50, and D95, respectively, D20≤D50×70%, D50≤t/4, D95≤t/2, and CV value ((standard deviation between D20 and D95)/D50)<40%. More desirably, 100 nm≤D50≤t/4. In other words, the distribution is such that the value of D20 is 70% of the value of D50 or less, the value of D50 is t/4 or less, the value of D95 is t/2 or less, and the CV value ((standard deviation between D20 and D95)/D50) is less than 40%.

The dielectric ceramic conforming to the present invention ensures reliability with the design of a highly resistive grain boundary phase, so when D50>t/4 is true, the longevity inevitably drops due to a decrease in the number of grain boundaries between the internal electrodes. However, desirably D50 is 100 nm or more to ensure sufficient dielectric constant because a D50 of less than 100 nm leads to extreme drop in dielectric constant. Furthermore, when D95 is t/2 or more, the number of coarse grains increases and consequently the electrode interface decreases in partial areas of the dielectric layer sandwiched between two electrodes, and the longevity deteriorates from there. Also under the present invention, coexistence of fine grains sufficiently smaller than the average grain size with other grains keeps the dielectric constant from dropping, while increasing the number of grain boundaries and thereby improving reliability. However, the presence of grains that are not small enough causes the apparent dielectric constant of the dielectric layer to drop, which is undesirable. When sintering is implemented at low temperature using B or Li, however, D20 can be made extremely small to less than 70% of D50, and this keeps the dielectric constant from dropping. In other words, it is important that fine grains are present in the range up to D20. Furthermore, both high dielectric constant and good longevity are achieved at the same time as a result of uniformly small grain sizes of less than 40% in CV value in the range of D20 to D95. If the CV value becomes 40% or more, varying grain sizes cause the longevity to drop.

Also under the present invention, the sintered dielectric ceramic layer 3 contains secondary phase grains constituted by at least Re (Re represents at least one of Eu, Gd, Dy, Ho, Er, Yb, and Y), Ba, and Ti. The abundance of the secondary phase grains is characterized in that, on average, there are at least five grains of 0.1 μm or more in grain size in a random 5 μm×5 μm area of the dielectric ceramic layer 3. It is also characterized in that, on average, there are fewer than two grains whose grain size is larger than the D80 of the primary phase grain.

Under the present invention, it is considered that the presence of rare earths in the grain boundary phase together with B—Li—Ba has the effect of increasing the insulation property of the grain boundary phase and thereby ensuring reliability. Once the rare earths dissolve in B—Li in the initial phase of sintering, however, sintering property of primary phase grains is disturbed. Accordingly, rare earths of relatively large grain sizes are caused to exist as a secondary phase to promote the sintering of primary phase grains and also allow the rare earths to gradually diffuse from the secondary phase to the grain boundary phase, thereby achieving both sintering property and reliability.

If the grain size in the secondary phase is smaller than 0.1 μm, the rare earths diffuse quickly to the grain boundary and sintering property deteriorates as a result. If there are many areas of the secondary phase which are larger than the D80 of the primary phase grain, on the other hand, the diffusion speed drops and rare earths are not distributed sufficiently at the grain boundary, which results in lower reliability.

In addition, the present invention is characterized in that, with respect to the Ba/Ti ratios in the grain boundary phase and grain of the primary phase grains as obtained by EELS analysis (analysis using the electron energy loss spectroscopy method), the Ba/Ti ratio in the grain boundary phase divided by the Ba/Ti ratio in the grain is less than 1.2. Under the present invention, partial diffusion of Ba from the primary component $BaTiO_3$ to the grain boundary phase has the effect of low-temperature necking to form a dense condition. If a lot of Ba diffuses from the primary phase grains to the grain boundary phase, however, the crystalline property at the primary phase grain interface drops and defects develop as a result, which is considered a cause of lower reliability. Accordingly, the Ba/Ti ratio in the grain boundary phase divided by the Ba/Ti ratio in the grain must be designed not to exceed 1.2.

The external electrode 5 is constituted by Cu, Ni, Ag, Cu—Ni alloy, or Cu—Ag alloy, and formed by applying a conductive paste on a sintered ceramic laminate 2 and baking the paste or by applying a conductive paste on an unsintered ceramic laminate 2 and baking the paste simultaneously when the dielectric ceramic layers 3 are sintered. Plating layers 6, 7 are formed on top of the external electrode 5 by means of electroplating, etc. The first plating layer 6 serves to protect the external electrode 5 and is constituted by Ni, Cu, etc. The second plating layer 7 serves to improve solder wettability and is constituted by Sn, Sn alloy, etc.

EXAMPLES

The present invention is explained in greater detail below by using examples, but it should be noted that the present invention is not at all limited to these examples.

<<Preparation of Dielectric Ceramic Material>>

As a starting material for primary component, each $BaTiO_3$ powder having the applicable average grain size and specific surface area as shown in Table 1 was prepared. As auxiliary components, $BaCO_3$, $Re_2O_3$, MnO, $MoO_3$, $V_2O_5$, $B_2O_3$, and $Li_2O$ powders were prepared. First, $BaCO_3$ was weighed so that, when the Ba/Ti ratio in the dielectric ceramic composition was expressed as m, m would achieve each applicable value specified in Table 1. Next, the remaining powders were weighed so that the applicable values specified in Table 1 would be achieved based on the composition formula expressed by $100\ BaTiO_3 + aRe_2O_3 + bMnO + cV_2O_5 + dMoO_3 + eCuO + fB_2O_3 + gLi_2O$ (where Re represents at least one type of element selected from Eu, Gd, Dy, Ho, Er, Yb, and Y, and a to g represent mol numbers relative to 100 mol of the primary component constituted by $BaTiO_3$) in the range satisfying $0.10 \le a \le 0.50$, $0.20 \le b \le 0.80$, $0 \le c \le 0.12$, $0 \le d \le 0.07$, $0.04 \le c+d \le 0.12$, $0 \le e \le 1.00$, $0.50 \le f \le 2.00$, $0.6 \le (100\ (m-1)+2g)/2f \le 1.3$, and $0.5 \le 100\ (m-1)/2g \le 5.1$.

TABLE 1

| Sample No. | Grain size of $BaTiO_3$ material powder [μm] | Specific surface area of $BaTiO_3$ material powder [m²/g] | Ba/Ti in material powder m | Rare earth $Re_2O_3$ Element | Rare earth $Re_2O_3$ Amount a | Amount of MnO added b | Amount of $V_2O_5$ added c | Amount of $M_oO_3$ added d | Amount of CuO added e | Amount of $B_2O_3$ added f | Amount of $Li_2O$ added g |
|---|---|---|---|---|---|---|---|---|---|---|---|
| 1 | 0.15 | 6 | 1.017 | Gd | 0.3 | 0.5 | 0.05 | 0.05 | 0 | 1.4 | 0.4 |
| 2 | 0.15 | 6 | 1.015 | Gd | 0.3 | 0.5 | 0.08 | 0.03 | 0 | 1.2 | 0.3 |
| 3 | 0.15 | 6 | 1.013 | Dy | 0.3 | 0.7 | 0 | 0.05 | 0.1 | 1.4 | 0.4 |
| 4 | 0.15 | 6 | 1.017 | Eu | 0.3 | 0.5 | 0 | 0.05 | 0 | 1.2 | 0.3 |
| 5* | 0.15 | 6 | 1.013 | Gd | 0.5 | 0.3 | 0.08 | 0.03 | 0.3 | 1.4 | 0.4 |
| 6* | 0.15 | 6 | 1.017 | Dy | 0.2 | 0.7 | 0 | 0.03 | 0.1 | 1.4 | 0.4 |
| 7 | 0.2 | 4.5 | 1.017 | Gd | 0.3 | 0.5 | 0.05 | 0.05 | 0 | 1.4 | 0.4 |
| 8 | 0.2 | 4.5 | 1.015 | Dy | 0.3 | 0.5 | 0.05 | 0.05 | 0.1 | 1.7 | 0.5 |
| 9 | 0.2 | 4.5 | 1.015 | Ho | 0.5 | 0.4 | 0 | 0.03 | 0.7 | 1.4 | 0.3 |
| 10* | 0.2 | 4.5 | 1.017 | Gd | 0.3 | 0.5 | 0 | 0.05 | 0 | 1.7 | 0.3 |
| 11* | 0.2 | 4.5 | 1.013 | Gd | 0.3 | 0.3 | 0.05 | 0.03 | 0.3 | 1.4 | 0.4 |
| 12* | 0.2 | 4.5 | 1.015 | Dy | 0.3 | 0.7 | 0 | 0.03 | 0.1 | 1.7 | 0.5 |
| 13 | 0.2 | 4 | 1.017 | Eu | 0.5 | 0.5 | 0.05 | 0.03 | 0.1 | 1.7 | 0.4 |
| 14 | 0.2 | 4 | 1.015 | Gd | 0.3 | 0.5 | 0.05 | 0.05 | 0 | 1.4 | 0.4 |
| 15* | 0.2 | 4 | 1.013 | Dy | 0.3 | 0.5 | 0 | 0.05 | 0.3 | 1.4 | 0.5 |
| 16 | 0.2 | 3.5 | 1.015 | Gd | 0.3 | 0.5 | 0 | 0.03 | 0.1 | 1.2 | 0.3 |
| 17* | 0.2 | 3.5 | 1.013 | Gd | 0.3 | 0.5 | 0 | 0.05 | 0 | 1.4 | 0.4 |
| 18 | 0.25 | 3 | 1.017 | Gd | 0.3 | 0.5 | 0.05 | 0.05 | 0 | 1.4 | 0.4 |
| 19 | 0.25 | 3 | 1.017 | Gd | 0.3 | 0.5 | 0.05 | 0.03 | 0 | 1.4 | 0.4 |
| 20 | 0.25 | 3 | 1.015 | Dy | 0.3 | 0.5 | 0.07 | 0.05 | 0.1 | 1.4 | 0.4 |

TABLE 1-continued

| Sample No. | Grain size of BaTiO$_3$ material powder [μm] | Specific surface area of BaTiO$_3$ material powder [m$^2$/g] | Ba/Ti in material powder m | Rare earth Re$_2$O$_3$ Element | Amount a | Amount of MnO added b | Amount of V$_2$O$_5$ added c | Amount of M$_o$O$_3$ added d | Amount of CuO added e | Amount of B$_2$O$_3$ added f | Amount of Li$_2$O added g |
|---|---|---|---|---|---|---|---|---|---|---|---|
| 21* | 0.25 | 3 | 1.015 | Gd | 0.3 | 0.5 | 0.05 | 0.05 | 0.1 | 1.4 | 0.5 |
| 22* | 0.25 | 3 | 1.013 | Gd | 0.2 | 0.4 | 0.07 | 0.05 | 0.3 | 1.7 | 0.4 |
| 23* | 0.25 | 3 | 1.017 | Ho | 0.5 | 0.7 | 0.05 | 0.05 | 0 | 1.2 | 0.3 |
| 24* | 0.45 | 4 | 1.013 | Gd | 0.3 | 0.5 | 0 | 0.05 | 0 | 1.4 | 0.4 |

Next, BaTiO$_3$, BaCO$_3$, Gd$_2$O$_3$, MnCO$_3$, MoO$_3$, V$_2$O$_5$, B$_2$O$_3$ and Li$_2$O powders as weighed and taken above were mixed and then wet-mixed and kneaded in a ball mill using ethyl alcohol as a medium. For each sample, the agitation time was adjusted as shown in Table 2.

TABLE 2

| Sample No. | Agitation time [h] | Hydrogen concentration during sintering [%] | Sintering temperature [° C.] |
|---|---|---|---|
| 1 | 16 | 0 | 960 |
| 2 | 16 | 0 | 920 |
| 3 | 24 | 0.5 | 960 |
| 4 | 16 | 2 | 940 |
| 5* | 24 | 0.5 | 980 |
| 6* | 24 | 2 | 920 |
| 7 | 16 | 0 | 960 |
| 8 | 24 | 0.5 | 960 |
| 9 | 16 | 0 | 940 |
| 10* | 24 | 0.5 | 940 |
| 11* | 16 | 0.5 | 980 |
| 12* | 16 | 2 | 940 |
| 13 | 16 | 0.5 | 960 |
| 14 | 24 | 2 | 960 |
| 15* | 16 | 0 | 980 |
| 16 | 16 | 2 | 960 |
| 17* | 24 | 2 | 980 |
| 18 | 24 | 0.5 | 460 |
| 19 | 32 | 0 | 920 |
| 20 | 24 | 0.5 | 960 |
| 21* | 16 | 0 | 980 |
| 22* | 24 | 0 | 980 |
| 23* | 16 | 0.5 | 960 |
| 24* | 24 | 2 | 960 |

<<Preparation of Laminated Ceramic Capacitor>>

Polyvinyl butyral binder was added to the above crushed mixture and the mixture was wet-mixed in a ball mill to produce a ceramic slurry. This ceramic slurry was molded into sheets using the die-coater method to obtain ceramic green sheets. Next, a conductive paste containing Cu was screen-printed on the green sheets to produce conductive paste films which would become internal electrodes. Furthermore, the ceramic green sheets on which conductive paste films were formed were layered in such a way that the led-out sides of the conductive paste films would stagger, to obtain a raw laminate which would become a capacitor body.

The raw laminate was heated to a temperature of 300° C. in a N$_2$ ambience to remove the binder. Each sample comprising this binder-free laminate was sintered for 2 hours at the applicable temperature shown in Table 2 in a reducing ambience constituted by N$_2$, H$_2$O, and hydrogen of the applicable concentration as shown in Table 2. In the temperature-lowering step during sintering, annealing was performed at 700° C. in a N$_2$ ambience to obtain a capacitor body being the sintered raw laminate. Next, an external electrode paste containing Cu and glass powder was applied on both ends of the obtained capacitor body and then baked at 900° C., to form external electrodes.

The external dimensions of the laminated ceramic capacitor thus obtained were 0.5 mm wide, 1.0 mm long, and 0.5 mm high. The number of dielectric layers sandwiched between the internal electrodes was 80, and the average thickness per layer, or t, is shown in Table 3.

<<Analysis of Ceramic Structure>>

To study the grain size distribution of primary phase grains, a polished surface of each capacitor sample was observed with a FE-SEM and the maximum size and minimum size were obtained from among 1,000 or more crystal grains, and the median value of the two was taken as the grain size. Grain sizes thus obtained were used to create a cumulative count distribution of grain sizes of primary phase grains, to calculate D20 (grain size at the cumulative 20% point), D50 (grain size at the cumulative 50% point), D95 (grain size at the cumulative 95% point), and CV value ((standard deviation between D20 and D95)/D50).

Figure 3:
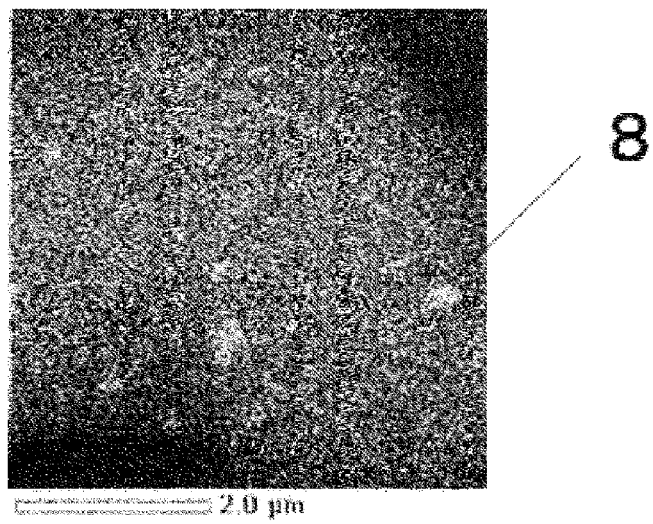
[FIG. 3] Rare earth element map obtained by measuring the dielectric ceramic layer using a STEM

Also, to study the distribution of secondary phase grains, rare earth element mapping was performed using a STEM over a 5 μm×5 μm area, as shown in FIG. 3, of the dielectric ceramic layer sandwiched between the internal electrode layers. The 5 μm×5 μm area was obtained by polishing the laminated ceramic capacitor in parallel with the internal electrodes to expose the dielectric layer between the internal electrodes, and sampling was performed on this exposed surface. As a result of the above mapping, a location where rare earth elements were uniformly distributed in the grain was considered the second phase, and the grain size at this location was measured on a TEM image of the location using the same means mentioned above which was used to obtain the size of the primary phase grain. Then, the number of secondary phase grains having a diameter of 0.1 μm or more, which were present in the aforementioned area, was recorded. Also, the number of secondary phase grains having a diameter of the D80 of the primary phase grain or more, among the aforementioned secondary phase grains, was recorded. For each sample, the average was obtained using photographs capturing 30 random locations.

Figure 4:
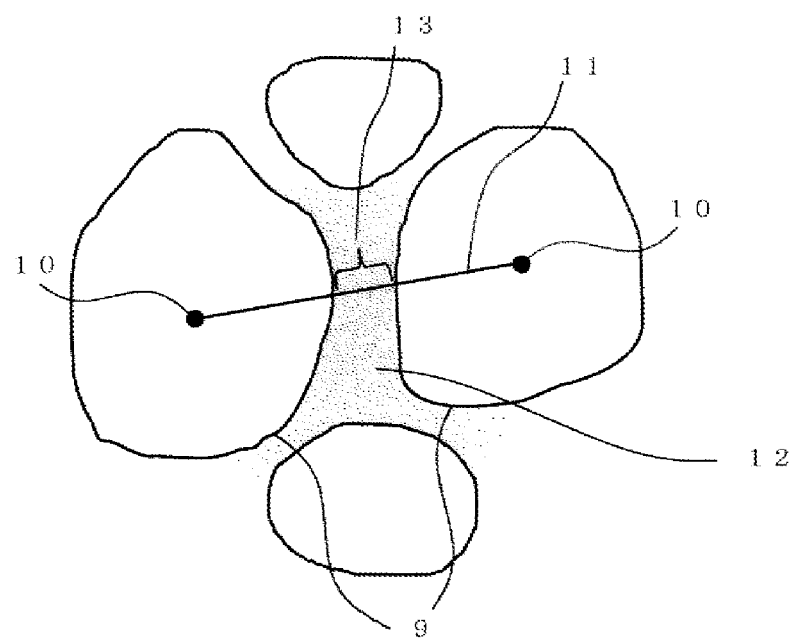
[FIG. 4] Section view illustrating the EELS-analyzed area of the dielectric ceramic layer

To compare the Ba/Ti ratio in the primary phase grain and Ba/Ti ratio in the grain boundary phase, two random primary phase grains 9 positioned adjacent to each other were selected first as shown in FIG. 4, and the concentrations of Ba and Ti were measured by EELS analysis (analysis method using the electron energy loss spectroscopy method) along a straight line (analysis area 11) connecting centers 10 of these grains. Next, the average Ba/Ti ratio was calculated in an analysis area 13 positioned on a grain boundary phase 12 in the analysis area 11 and taken as the Ba/Ti ratio in the grain boundary layer. Furthermore, the average Ba/Ti ratio was calculated in the analysis area 11 excluding the analysis area 13 and taken as the Ba/Ti ratio in the primary phase grain. Then, the Ba/Ti ratio in the grain boundary phase was divided by the Ba/Ti ratio in the primary phase grain. Measurement was performed at 100 random locations on each sample to obtain the average. The above results are shown in Table 3.

<<Evaluation of Electrical Characteristics>>

Dielectric constant, temperature characteristics and longevity under stress were obtained for the laminated ceramic capacitor pertaining to each sample obtained. Dielectric constant was calculated from the capacitance measured under the conditions of 25° C. in temperature, 1 kHz and 1 Vrms, and samples whose dielectric constant was 1800 or more were deemed "Good." Temperature characteristics were measured under the conditions of 1 kHz and 1 Vrms, and the maximum rate of change in capacitance due to temperature in a range of −55 to 125° C. was calculated with reference to the capacitance at 25° C. Samples whose rate of change was within ±15% in this range, or specifically samples satisfying the X7R characteristics under the EIA standard, were deemed "Good." As for longevity under stress, a high-temperature load test was conducted by applying a voltage of 20 kV/mm in equivalent electric field intensity at a temperature of 150° C. and samples whose time to failure was over 100 hours, where a failure is defined as a point in time when the insulation resistance is less than $10^5 \Omega$, were deemed "Good." The above results are shown in Table 3.

because the number of secondary phase grains having a grain size larger than the D80 of the primary phase grain exceeded the range specified by the present invention and reliability deteriorated as a result. Sample 10 also had a short time to failure of less than 100 hours because the Ba/Ti ratio at the primary phase grain boundary was 1.2 times the Ba/Ti ratio in the grain or more, which was out of the range specified by the present invention. It should be noted that, in Tables 1 to 3, these samples are denoted by * to indicate that they are out of the scope of examples of the present invention.

All other samples meeting the ranges specified by the present invention produced satisfactory results as represented by a high dielectric constant of 1800 or more, temperature characteristics satisfying X7R characteristics, and good longevity traits of over 100 hours even under a high-temperature load equivalent to 150° C. in temperature and 20 kV/mm in electric field intensity.

Description of the Symbols

1: Laminated ceramic capacitor, 2: Ceramic laminate, 3: Dielectric ceramic layer, 4: Internal electrode, 5: External electrode, 6: External electrode first plating layer, 7: External electrode second plating layer, 8: Secondary phase where rare earth elements are segregated, 9: Two adjacent primary phase grains, 10: Center of primary phase grain, 11: EELS analysis area, 12: Grain boundary phase, 13: EELS analysis area positioned on the grain boundary phase

TABLE 3

| Sample No. | Layer thickness t [μm] | Distribution of primary phase grains | | | | | Number of secondary phase Grain size ≥ 0.1 μm | Grain size ≥ (D80 of primary phase Brain) | (Ba/Ti in grain boundary phase)/(Ba/Ti in primary phase grain) | Dielectric constant | Temperature characteristics | Time to failure [h] |
|---|---|---|---|---|---|---|---|---|---|---|---|---|
| | | D20 [μm] | D50 [μm] | D50 × 70% [μm] | D95 [μm] | CV value | | | | | | |
| 1 | 0.9 | 0.12 | 0.20 | 0.14 | 0.41 | 30 | 5.9 | 1.1 | 1.09 | 1800 | X7R | ○ |
| 2 | 0.9 | 0.13 | 0.20 | 0.14 | 0.42 | 31 | 5.2 | 0.7 | 1.07 | 1900 | X7R | ○ |
| 3 | 1.1 | 0.12 | 0.19 | 0.13 | 0.40 | 30 | 5.5 | 0.9 | 1.06 | 1800 | X7R | ○ |
| 4 | 1.1 | 0.12 | 0.20 | 0.14 | 0.43 | 35 | 5.6 | 0.9 | 1.12 | 1900 | X7R | ○ |
| 5* | 0.9 | 0.19 | 0.26 | 0.18 | 0.47 | 27 | 5.4 | 0.8 | 1.11 | 2500 | X7R | x |
| 6* | 1.1 | 0.12 | 0.19 | 0.13 | 0.39 | 28 | 3.9 | 0.4 | 1.11 | 1800 | X7R | x |
| 7 | 1.1 | 0.18 | 0.26 | 0.18 | 0.49 | 30 | 6.4 | 1.9 | 1.13 | 2100 | X7R | ○ |
| 8 | 1.1 | 0.17 | 0.26 | 0.18 | 0.47 | 28 | 5.1 | 1.6 | 1.14 | 2200 | X7R | ○ |
| 9 | 1.1 | 0.17 | 0.27 | 0.19 | 0.49 | 32 | 7.2 | 1.8 | 1.12 | 2100 | X7R | ○ |
| 10* | 1.1 | 0.16 | 0.25 | 0.18 | 0.46 | 27 | 6.2 | 1.7 | 1.22 | 1900 | X7R | x |
| 11* | 1.1 | 0.16 | 0.28 | 0.20 | 0.52 | 30 | 7.7 | 1.9 | 1.07 | 2300 | X7R | x |
| 12* | 1.1 | 0.14 | 0.23 | 0.16 | 0.41 | 29 | 4.8 | 1.4 | 1.10 | 1600 | X7R | x |
| 13 | 1.2 | 0.17 | 0.26 | 0.18 | 0.44 | 25 | 10.2 | 1.8 | 1.17 | 1900 | X7R | ○ |
| 14 | 1.2 | 0.18 | 0.27 | 0.19 | 0.46 | 27 | 7.3 | 1.7 | 1.14 | 2000 | X7R | ○ |
| 15* | 1.2 | 0.20 | 0.29 | 0.20 | 0.61 | 37 | 5.3 | 1.2 | 1.15 | 3300 | X5R | x |
| 16 | 1.2 | 0.18 | 0.27 | 0.19 | 0.56 | 38 | 6.5 | 1.5 | 1.12 | 1900 | X7R | ○ |
| 17* | 1.2 | 0.19 | 0.30 | 0.21 | 0.62 | 25 | 6.4 | 1.4 | 1.10 | 2400 | X7R | x |
| 18 | 1.4 | 0.21 | 0.32 | 0.22 | 0.57 | 27 | 9.3 | 1.8 | 1.17 | 2200 | X7R | ○ |
| 19 | 1.4 | 0.22 | 0.32 | 0.22 | 0.64 | 33 | 7.5 | 1.6 | 1.08 | 2200 | X7R | ○ |
| 20 | 1.4 | 0.16 | 0.27 | 0.19 | 0.52 | 34 | 6.9 | 1.8 | 1.09 | 1800 | X7R | ○ |
| 21* | 1.4 | 0.20 | 0.33 | 0.23 | 0.66 | 44 | 9.1 | 1.9 | 1.14 | 2600 | X7R | x |
| 22* | 1.4 | 0.25 | 0.33 | 0.23 | 0.60 | 25 | 11.2 | 1.3 | 1.12 | 2500 | X7R | x |
| 23* | 1.4 | 0.18 | 0.28 | 0.20 | 0.56 | 28 | 9.8 | 3.3 | 1.07 | 1900 | X7R | x |
| 24* | 1.4 | 0.30 | 0.44 | 0.31 | 0.85 | 32 | 5.1 | 1.6 | 1.08 | 2800 | X7R | x |

<<Test Results>>

Samples 5, 11, 15, 17, 21, 22, and 24 had a short time to failure of less than 100 hours because the grain size distribution of primary phase grains did not meet at least one of the conditions specified by the present invention. Samples 6 and 12 also had a short time to failure of less than 100 hours because the number of secondary phase grains having a grain size of 0.1 μm or more was less than the condition specified by the present invention and solid dissolution of rare earth elements to the primary phase was promoted as a result. Sample 23 also had a short time to failure of less than 100 hours

What is claimed is:

1. A laminated ceramic capacitor having: a ceramic laminate of roughly rectangular solid shape constituted by multiple layered dielectric ceramic layers which in turn are constituted by a dielectric ceramic constituted by primary phase grains whose primary component is $BaTiO_3$, secondary phase grains containing at least Re (Re represents at least one of Eu, Gd, Dy, Ho, Er, Yb, and Y), Ba, and Ti, and grain boundary phase containing at least one of B (boron) and Li (lithium) or both; internal electrodes which are made of Cu or Cu alloy and formed in a manner opposing each other via the dielectric ceramic and lead out alternately to different end faces; and external electrodes which are formed on both end faces of the dielectric ceramic layers and connected electrically to the internal electrodes led out to the end faces, wherein when a thickness of the dielectric ceramic layer sandwiched between the internal electrodes is given by t, and when grain sizes at cumulative 20%, cumulative 50%, and cumulative 95% points of a cumulative count distribution obtained by measuring sizes of the primary phase grains in the dielectric ceramic layer are given by D20, D50, and D95, respectively, D20≤D50×70%, D50≤t/4, D95≤t/2, and CV value ((standard deviation between D20 and D95)/D50)<40% are satisfied.

2. A laminated ceramic capacitor according to claim 1, wherein, on average, five or more of the secondary phase grains of 0.1 μm or more in grain size are present in a random 5 μm×5 μm area of the dielectric ceramic layer.

3. A laminated ceramic capacitor according to claim 2, wherein, on average, in the random 5 μm×5 μm area, there are fewer than two secondary phase grains whose grain size is greater than that at the cumulative 80% (D80) point of the cumulative count distribution of primary phase grains.

4. A laminated ceramic capacitor according to claim 1, wherein a Ba/Ti ratio in the grain boundary phase divided by a Ba/Ti ratio in the primary phase grain is 1.2 or less.

5. A laminated ceramic capacitor according to claim 2, wherein a Ba/Ti ratio in the grain boundary phase divided by a Ba/Ti ratio in the primary phase grain is 1.2 or less.

6. A laminated ceramic capacitor according to claim 3, wherein a Ba/Ti ratio in the grain boundary phase divided by a Ba/Ti ratio in the primary phase grain is 1.2 or less.

7. A laminated ceramic capacitor according to claim 1, wherein a thickness of the dielectric ceramic layer is 2 μm or less.

8. A laminated ceramic capacitor according to claim 1, wherein the dielectric ceramic is constituted by a dielectric ceramic composition which in turn is constituted by a primary component constituted by $BaTiO_3$ and auxiliary components constituted by Re, Mn, V, Mo, Cu, B, Li, Ca, and Sr, wherein the dielectric ceramic composition is expressed by $BaTiO_3$+ $aRe_2O_3$+$bMnO$+$cV_2O_5$+$dMoO_3$+$eCuO$+$fB_2O_3$+$gLi_2O$+ $xSrO$+$yCaO$ (where Re represents at least one type of element selected from Eu, Gd, Dy, Ho, Er, Yb, and Y, and a to g, x, and y represent mol numbers relative to 100 mol of the primary component constituted by $BaTiO_3$) and, when the mol ratio of (Ba+Sr+Ca)/Ti contained in the dielectric ceramic composition is given by m, 0.10≤a≤0.50, 0.20≤b≤0.80, 0≤c≤0.12, 0≤d≤0.07, 0.04≤c+d≤0.12, 0≤e≤1.00, 0.50≤f≤2.00, 0.6≤(100 (m−1)+2g)/2f≤1.3, 0.5≤100 (m−1)/2g≤5.1, 0≤x≤1.5, and 0≤y≤1.5 are satisfied.

9. A laminated ceramic capacitor according to claim 8, wherein Si contained as impurity in the dielectric ceramic composition accounts for 1.0 mol or less in equivalent $SiO_2$ relative to 100 mol of the primary component constituted by $BaTiO_3$.

10. A laminated ceramic capacitor according to claim 8, wherein the dielectric ceramic composition can be made denser at a sintering temperature of 1030° C. or below.

11. A laminated ceramic capacitor according to claim 8, wherein a thickness of the dielectric ceramic layer is 2 μm or less.

12. A laminated ceramic capacitor according to claim 9, wherein the dielectric ceramic composition can be made denser at a sintering temperature of 1030° C. or below.

13. A laminated ceramic capacitor according to claim 9, wherein a thickness of the dielectric ceramic layer is 2 μm or less.

* * * * *